Nov. 24, 1970  C. G. KELSEY  3,541,695

THREE-DIMENSIONAL TRACING UNIT

Filed May 7, 1968  5 Sheets-Sheet 4

3,541,695
THREE-DIMENSIONAL TRACING UNIT
Christopher George Kelsey, Glenalta, South Australia, Australia, assignor to Data Resolved Tools Pty. Ltd., Plympton, South Australia, Australia
Filed May 7, 1968, Ser. No. 727,262
Claims priority, application Australia, May 8, 1967, 21,368
Int. Cl. B431 *13/10*
U.S. Cl. 33—24     6 Claims

ABSTRACT OF THE DISCLOSURE

A three-dimensional tracing unit wherein a main carriage moves in an X axis direction, a secondary carriage in a Y axis direction and a probe in a Z axis direction, the unit having thereon an output track coupled to move with the main carriage in the X axis direction, and print-out means movable along the output track in response to the probe movement in the direction of either of the other (two) Y and Z axes.

---

This invention relates to a tracing unit suitable for tracing a three-dimensional object, for example a model, and recording orthographic projections thereof, or for operation in a reverse direction.

With the development of equipment capable of transposing data from three dimensional bodies to drawings determining points in space according ot orthographic projection convention, there is a need for a simple device which will effectively produce drawings from models or alternatively check models back from drawings. This invention achieves this object by providing a three-dimensional tracing unit having a main carriage movable in the direction of an X axis along a base, a secondary carriage movable in the direction of a Y axis across the main carriage, and a probe movable relative to the secondary carriage in the direction of a Z axis, means securing a table relative to the base, an output track coupled to the main carriage and movable over the table in the direction of the X axis, and print-out means guided for movement along the output track in response to probe movement in the direction of a said axis other than the X axis.

The device of this invention can be worked in reverse and for example, where two tables are used, one for X–Y and coordinates and the other for X–Z coordinates, the orthographic projections can be placed on the tables and read off with microscopic or closed television circuits, and the probe will move in response to the drawings to thereby check a model. Alternatively the probe may be relaced by machining means such as for example a cutter capable of cutting soft material. Alternatively, either the probe or the read-out means can be used as input means and the device can be coupled to an electric typewriter for the punching of tapes for the control of milling machines.

It will also be seen that in the simplest form the device can be mechanically coupled from the input to the output means on each side of the base, but this coupling is preferred to be of the servo-type and a servo-type coupling is described hereunder in some detail with reference to and is illustrated in the accompanying drawings, in which.

Figure 1:
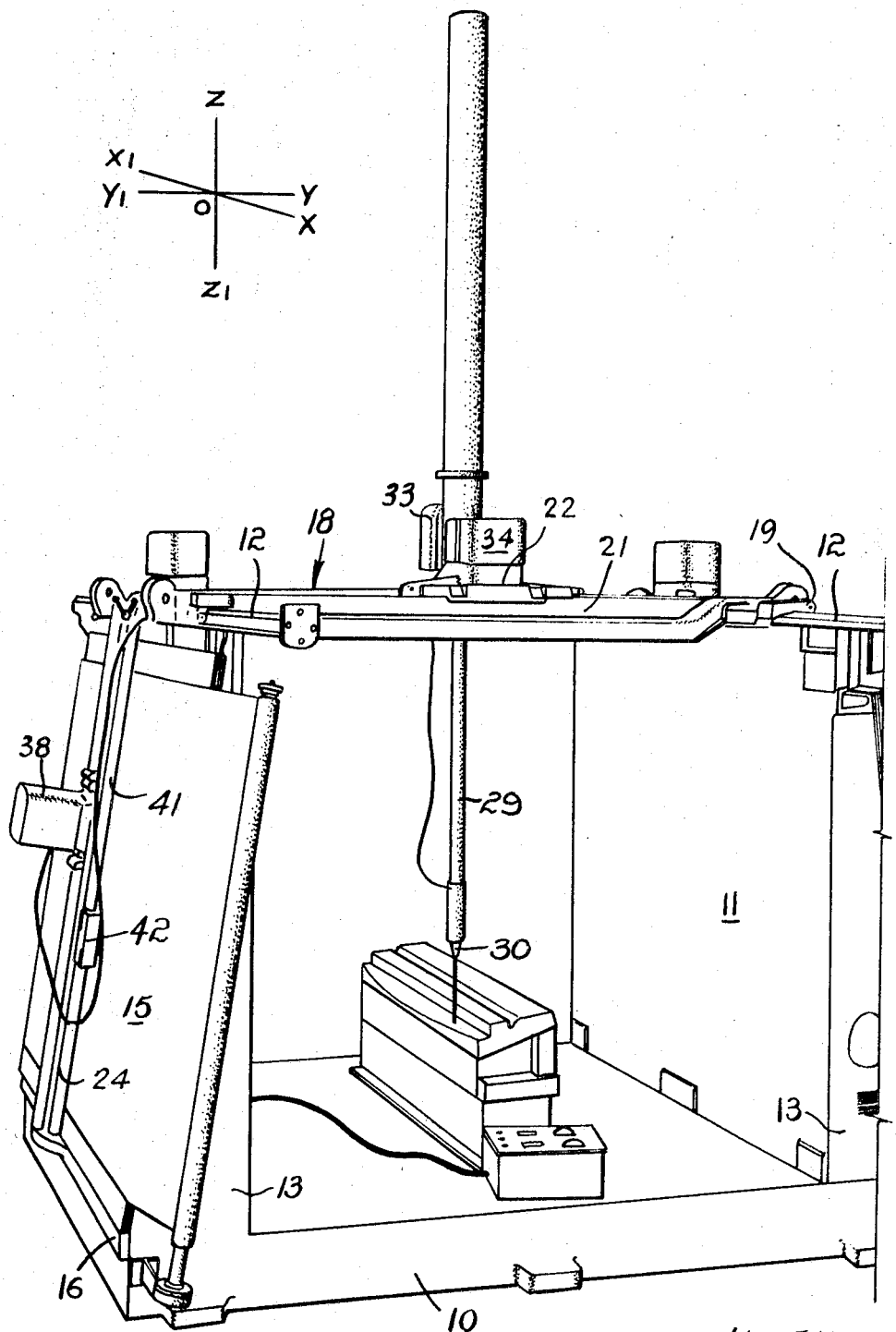
FIG. 1 is a perspective view of a machine according to this invention.

For the sake of simplicity this embodiment refers to the main carriage as having its movement along tracks in an $X_1$–O–X direction, the secondary carriage having its movement in a $Y_1$–O–Y direction and the tertiary carriage or probe having its movement in a $Z_1$–O–Z direction relative to the secondary carriage. The representation of these Cartesian coordinates on FIG. 1 illustrates the relationship.

A base 10 is comprised of a substantially flat metal member, say of cast-iron, and this has secured to it a pair of upstanding plaets 11 which terminate at their upper ends in main tracks 12. Each upstanding plate has a sloping frame 13 extending upwardly from extending side wings of the base 10, thus providing a "triangulated" structure to reduce deflection (accuracy being important), and the main tracks 12 are in this way retained exactly parallel to one another. Each of the sloping frames has secured to it a table 15, the table on one side being designated the "X–Y" table and on the other side "X–Z" table. Standing along the lower edge of each table is a lower support track 16, which is again parallel to the main tracks but of course disposed near the base of the device.

Figure 2:
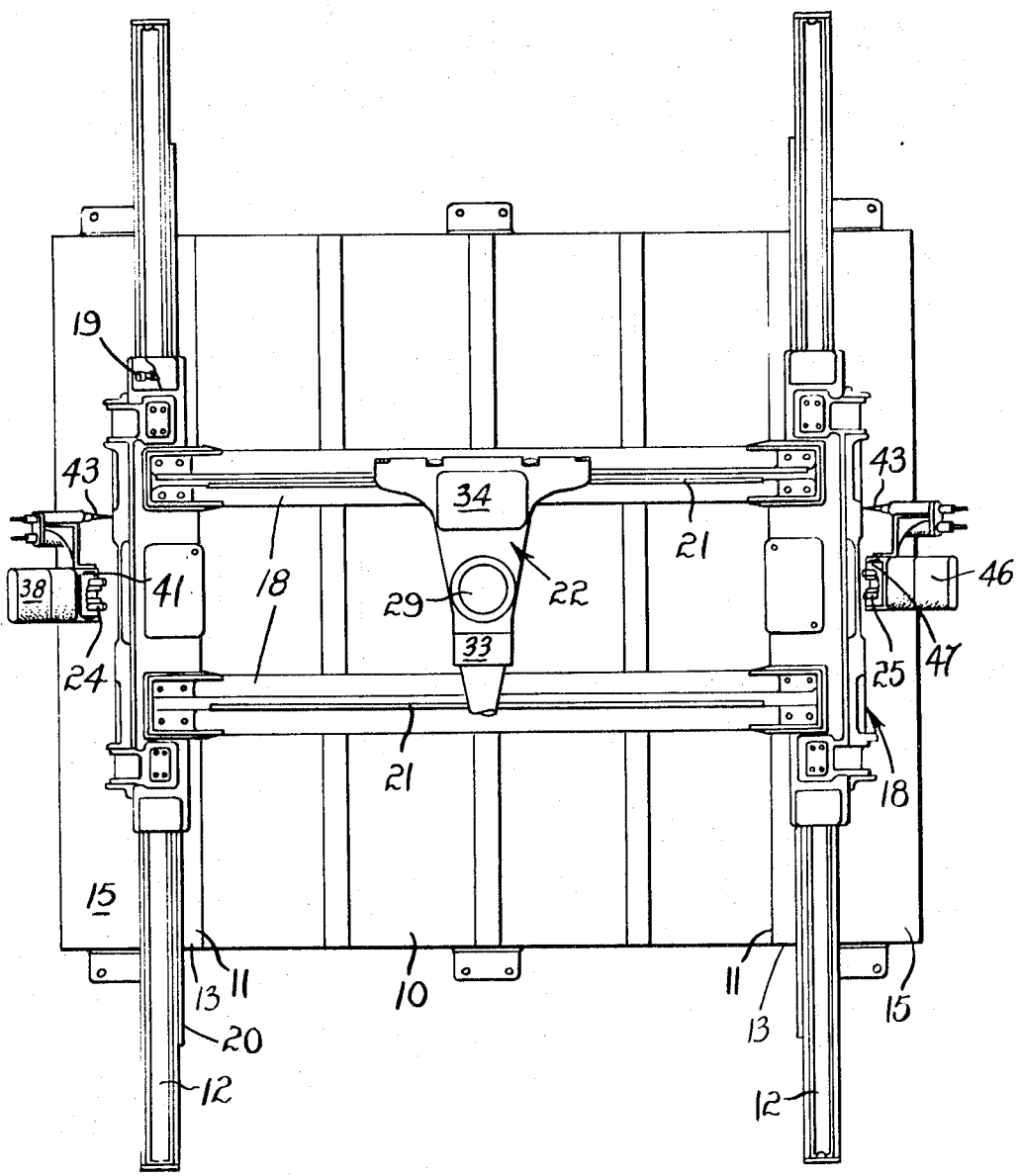
FIG. 2 is a plan view of the machine.
Figure 3:
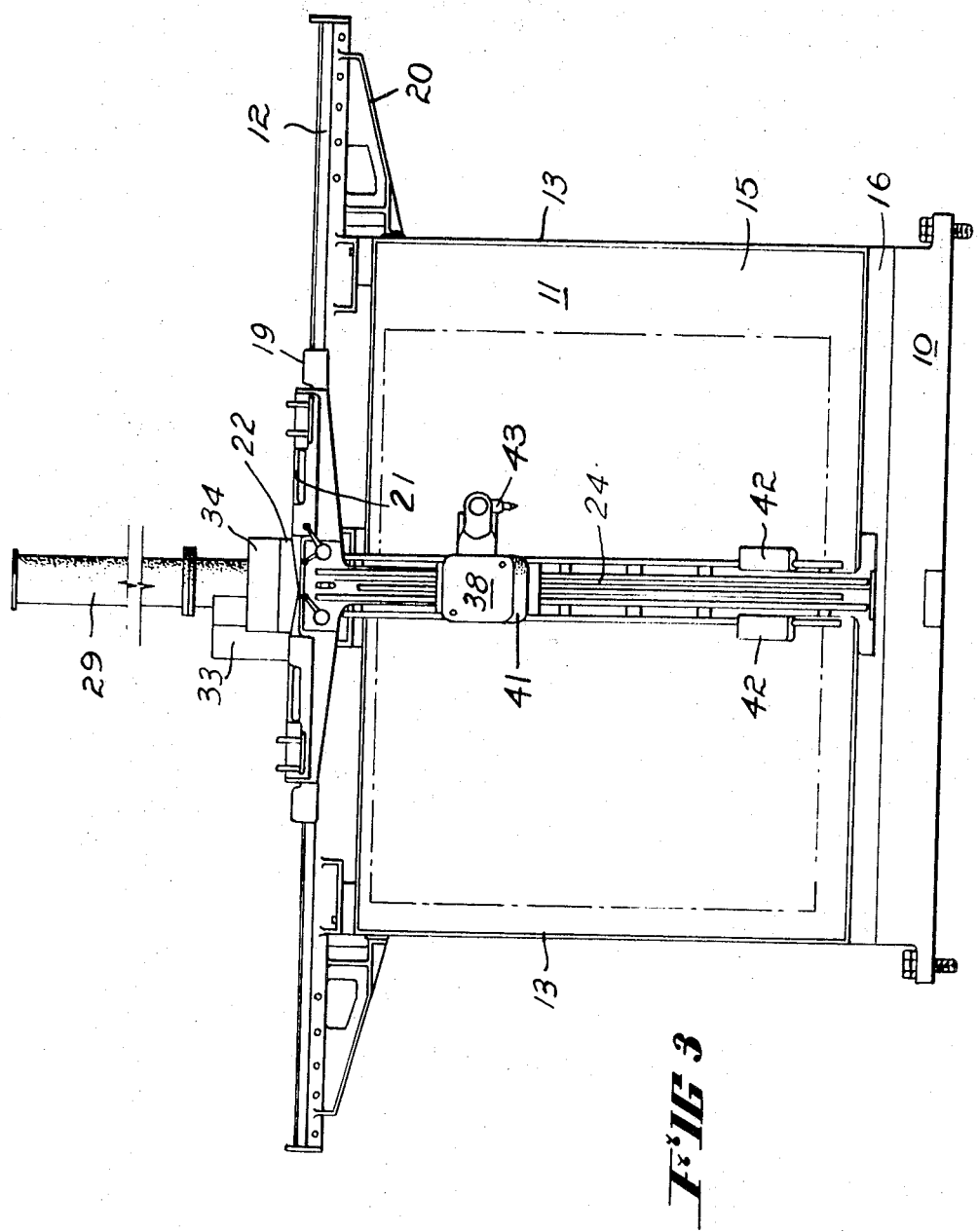
FIG. 3 is an elevation thereof.

The tracks 12 are of circular cross section and support a main carriage 18 which is provided with rollers 19 (FIG. 2) which engage on the tracks 12 to accurately guide the carriage 18. The tracks 12 are adjusted in position by screws from the track support arm 20, this providing track adjustment means in two directions (vertical and transverse). The main carriage 18 is provided with a pair of parallel secondary tracks 21 extending in a $Y_1$–O–Y direction, and these guide for movement a secondary carriage 22 in much the same way as the main carriage is guided. The main carriage has secured to its two ends output tracks designated 24 and 25 respectively, the track 24 moving over a table 15 (designated the X–Y table) and the track 25 over the other table 15 (designated the X–Z table). The lower ends of the output tracks are themselves guided for movement by respective outer support tracks 16.

Figure 4:
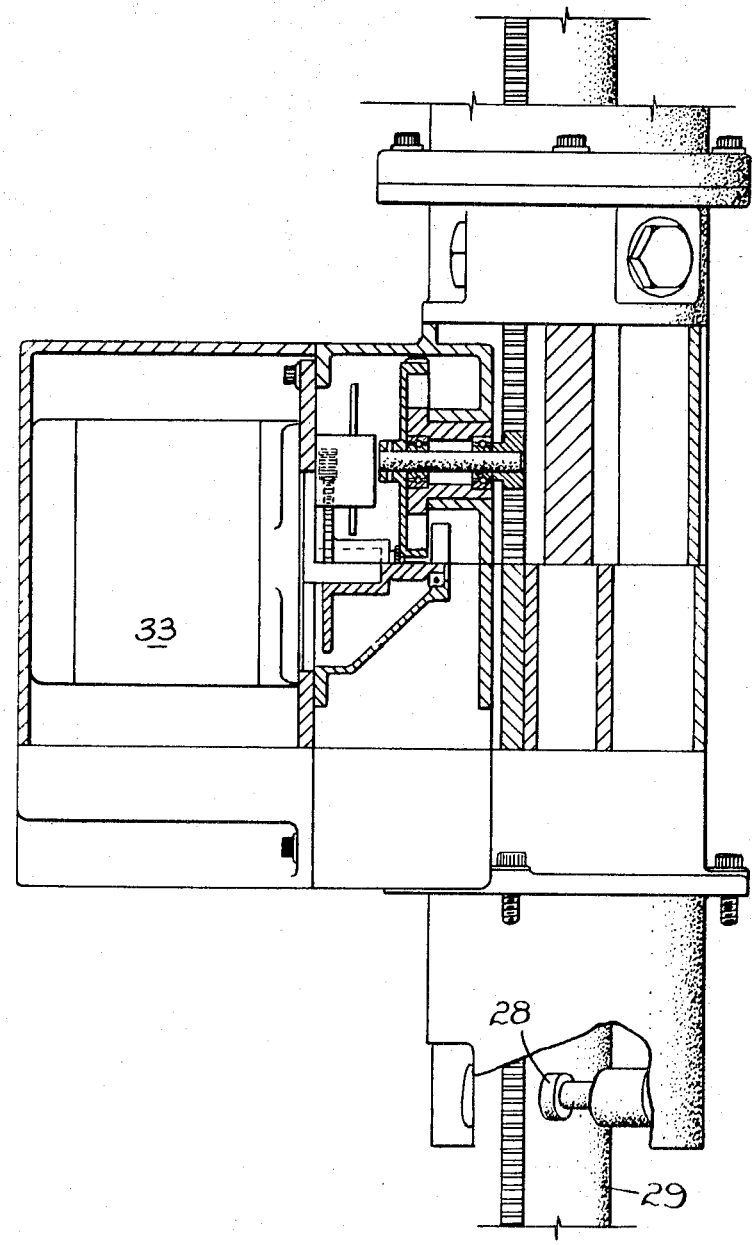
FIG. 4 is a section through the drive and servo control of a vertical spindle which carries a probe.
Figure 5:
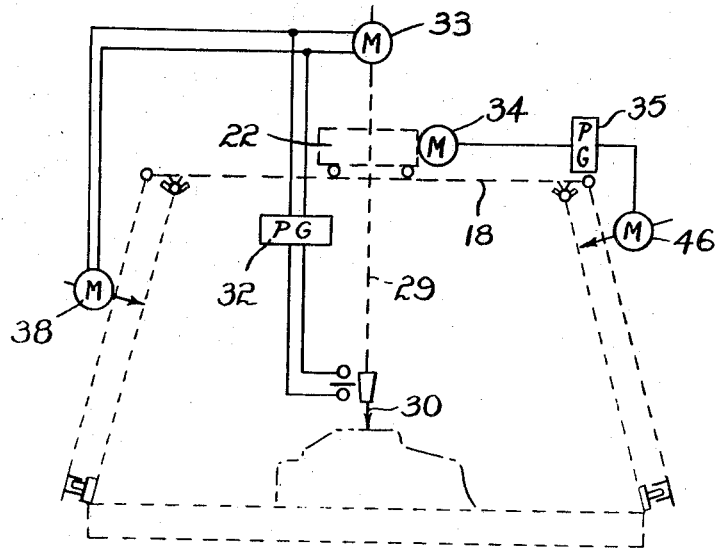
FIG. 5 is a diagrammatic representation of the servo control means.

The secondary carriage 22 is provided with two groups of guide rollers 28 (FIG. 4) which guide a probe carrying stem 29 in a $Z_1$–O–Z direction, the probe carrying stem being counter-balanced by means of a counter-balance weight carried on a cable passing over a pulley carried on the secondary carriage, this however not being illustrated. The lower end of the stem 29 supports a probe 30 which functions to drive a pulse generator 32, the probe being raised or lowered by a motor 33 controlled by pulse generator impulses triggered by vertical movement of the proble itself. The secondary carriage 22 is also driven by means of a transverse travel motor 34 in a transverse direction, also in response to pulse generator impulses triggered by transverse probe deflection, at speeds which will vary, for example when the probe must negotiate a very steep angle surface on a model. A transverse travel pulse generator 35 is coupled to the motor 34. The probe in raising or lowering the stem through its motor 33 in turn controls the pulse generator 32 which in turn controls a servo stepping motor 38 on an output carriage 41 carried on the output tracks 24 over the X–Z table. The output carriage 41 is counter-balanced by weights 42 in a manner somewhat similar to that of the stem which carries the probe. The output carriage is provided with a magnetically operated spring loaded pencil 43 or some other suitable read-out device so that the X and Z movements of the probe are faithfully reproduced on a template blank, tracing or the like on the X–Z table. Although it is simple to couple directly the Y movement of the secondary carriage and the Y movement of the output carriage over the X–Y table, a cable and pulley arrangement merely being necessary, in this embodiment use is again made of a pulse generator and stepping motor arrangement. As the secondary carriage traverses the main carriage by engagement of a pinion on the motor 34 with a rack on the main carriage, a second pulse generator (having a manually variable pulse rate but automatically variable inversely to the speed of stem 29) operates and this in turn drives a stepping motor 46 on an output carriage 47 over the X–Y table.

By use of electrical interconnection, there exists a great advantage that if the output carriage is (again driven by rack and pinion arrangement) provided with analogue or digital controls, movement can be imparted to input carriages thereby providing means for checking models, cutting models, or punching tapes through an encoder and an electric typewriter from the orthographic drawings, instead of the information being obtained from the model.

A consideration of the above embodiment will indicate that this invention provides an extremely simple and compact arrangement. It will be appreciated that the output tracks being directly coupled to the main carriage obviate the need of separate transmission means for X input and X output movement. It will also be clear that the main carriage can drive an electric typewriter in response to X displacement through a pulse counter or an encoder arranged according to conventional practice. It will be appreciated that by utilizing pulse counters or encoders in the three dimensions of travel, not merely can X–Y and X–Z drawings be produced (corresponding to plans and elevations respectively) but end elevations can also be produced by simply driving an independent carriage over an independent drawing arranged however in somewhat similar manner to the output tables described in the above embodiment, but the carriage being driven in accordance with Y and Z displacement. Thus the device simplifies the lofting of models to obtain three views therefrom, and it will be seen that the device is of such simple construction that it can be used by substantially unskilled operators. If digital systems are used as described herein, the device can be controlled directly from a digital computer.

What I claim is:

1. A three-dimensional tracing unit having a base, a pair of side frames upstanding from the base, parallel tracks on respective side frames, a main carriage guided for movement in the direction of an X axis by the side frame tracks, secondary tracks extending across the main carriage, a secondary carriage guided for movement in the direction of a Y axis by the secondary tracks, teritary guide means on the secondary carriage, a probe guided for movement in the direction of a Z axis by the tertiary guide means, a table on each side frame, output tracks coupled to each end of the main carriage to thereby be movable therewith in the X axis direction over the table, print-out means, and guide means guiding the print-out for movement along each output track in response to the probe movements in the direction of said axes other than the X axis.

2. A three-dimensional tracing unit according to claim 1 wherein respective Y and Z probe movements are sensed by electrical sensing means reproduced by motor means driving respective print-out means.

3. A three-dimensional tracing unit according to claim 2 wherein the electrical sensing means are constituted by respective pulse generators and respective motor means are constituted by respective stepping motors.

4. A three-dimensional tracing unit having a base, a pair of side frames upstanding from the base, parallel tracks on respective side frames, a main carriage guided for movement in the direction of an X axis by the said frame tracks, secondary tracks extending across the main carriage, a secondary carriage guided for movement in the direction of a Y axis in the secondary tracks, a pulse generator on the secondary carriage movable to sense displacement of the secondary carriage in the said Y axis direction, tertiary guide means on the secondary carriage, a stem guided for movement in the direction of a Z axis by the tertiary guide means, a further pulse generator on the secondary carriage movable in response to displacement of the stem in the said Z axis direction, a probe on the stem controlling said movements in Y axis and Z axis directions, tables on the said frames, output tracks coupled to the main carriage near ends thereof to thereby be movable therewith in the X axis direction over respective tables, respective output carriages movable along respective output tracks, and motors on the output carriages electrically coupled to said pulse generators to move the output carriages in response to Y and Z movements of the probe.

5. A three-dimensional tracing unit according to claim 4 further comprising sensing means on the output carriages controlling motors to drive the probe in X and Z directions.

6. A three-dimensional tracing unit according to claim 4 wherein means guiding carriages are constituted by rollers engaging tracks of circular section.

References Cited
UNITED STATES PATENTS

| | | |
|---|---|---|
| 2,807,878 | 10/1957 | Woods. |
| 3,032,881 | 5/1962 | Fengler. |
| 3,172,938 | 3/1965 | Schwartz. |

SAMUEL S. MATTHEWS, Primary Examiner